Dec. 21, 1965     J. A. LAUCK     3,224,197
HYDROSTATIC TRANSMISSION
Filed Oct. 3, 1963     3 Sheets-Sheet 1
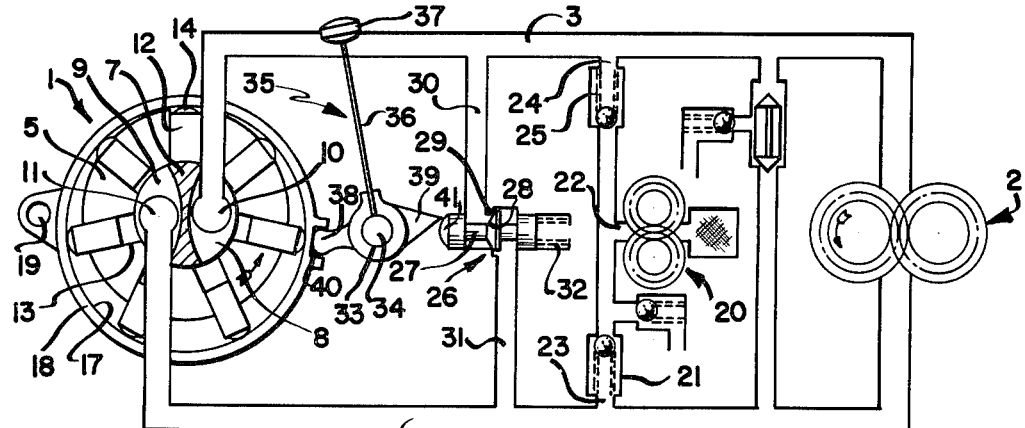
FIG_1
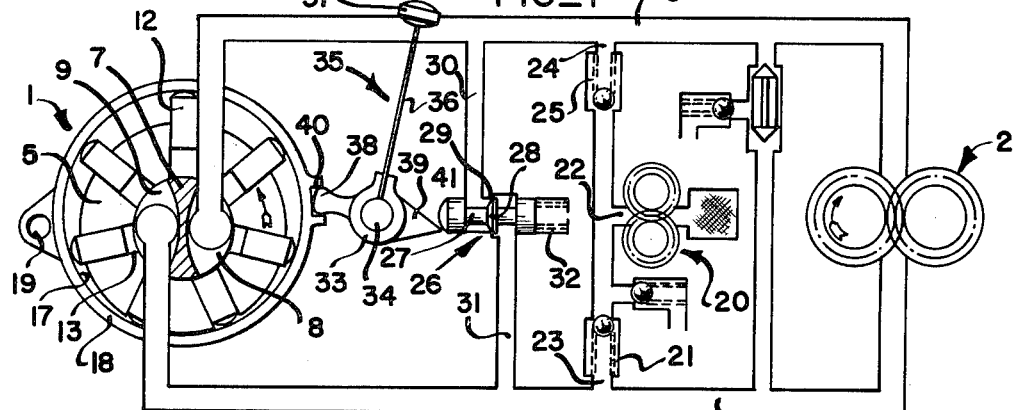
FIG_2
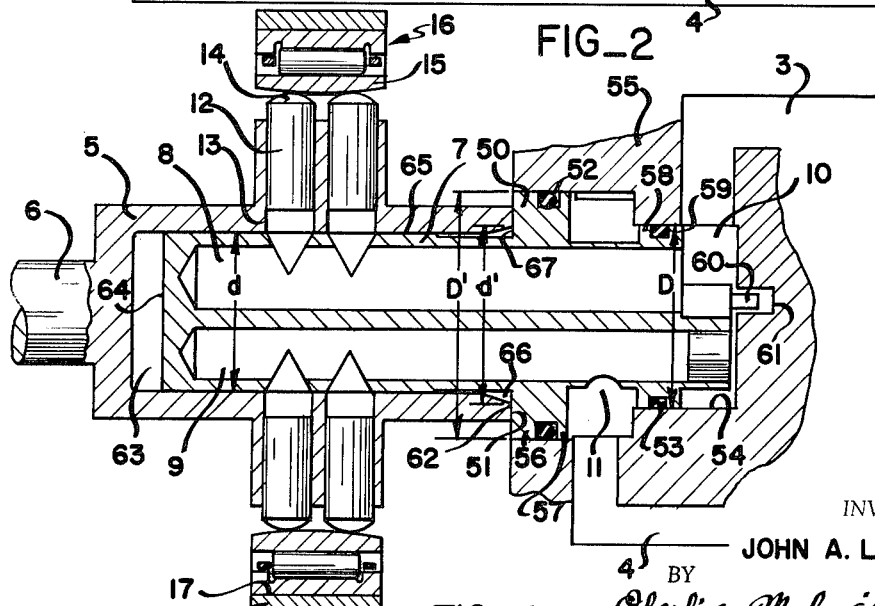
FIG_8
INVENTOR.
JOHN A. LAUCK
BY
Oberlin, Maky & Donnelly
ATTORNEYS

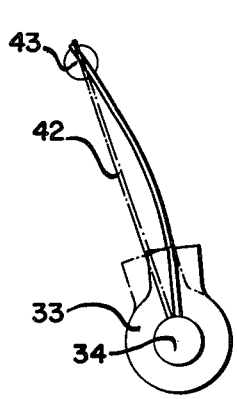
FIG_3
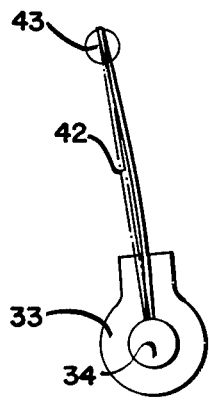
FIG_4
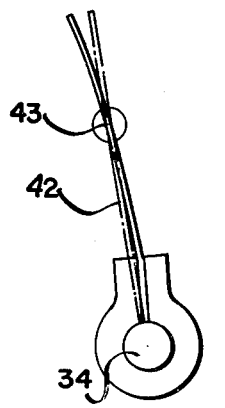
FIG_5
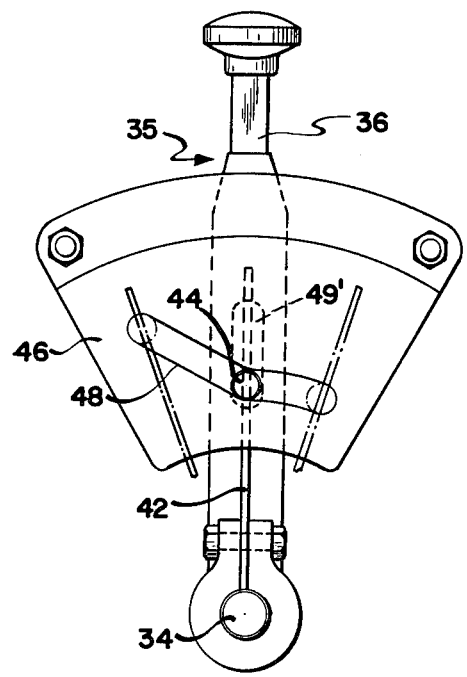
FIG_6
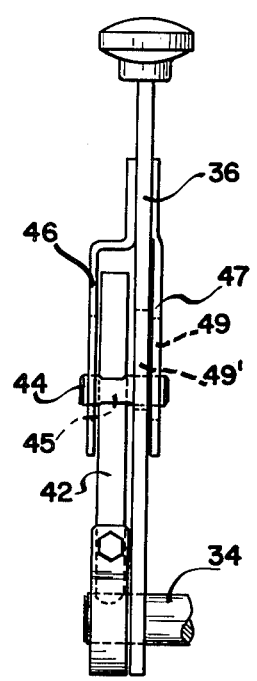
FIG_7
INVENTOR.
JOHN A. LAUCK
BY
Oberlin, Maky & Donnelly
ATTORNEYS Dec. 21, 1965　　　J. A. LAUCK　　　3,224,197
HYDROSTATIC TRANSMISSION
Filed Oct. 3, 1963　　　3 Sheets-Sheet 3
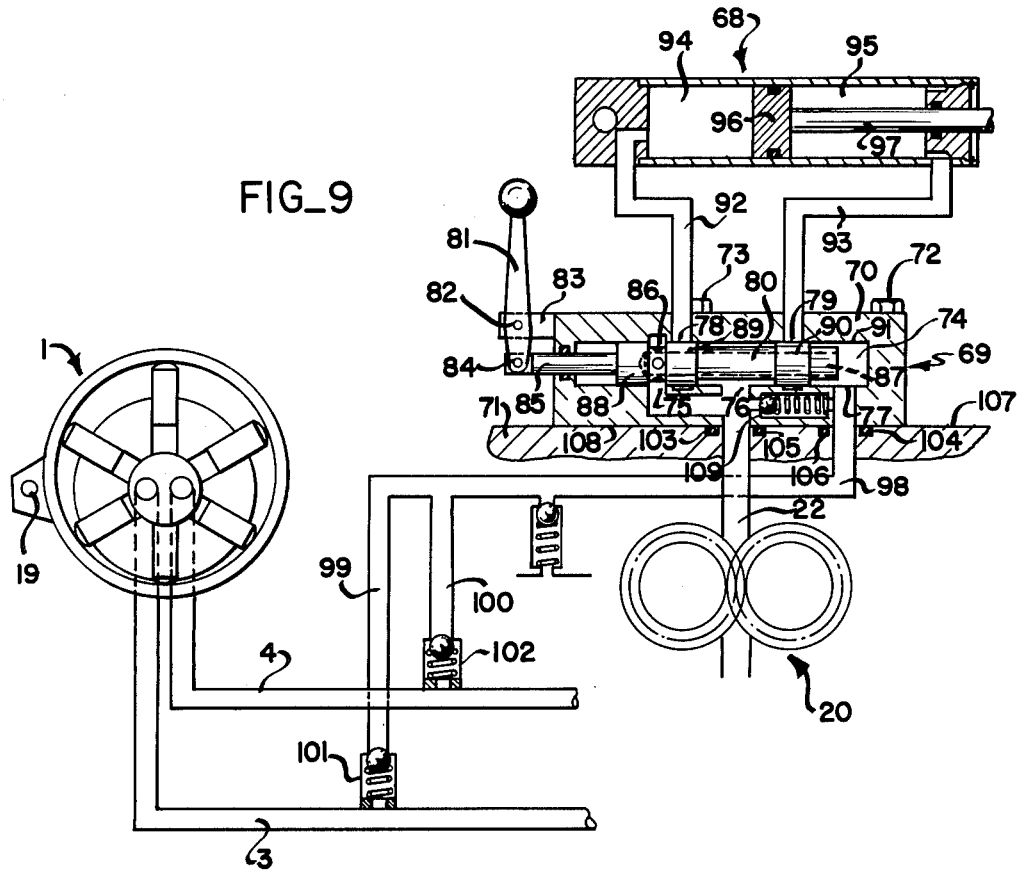
FIG_9
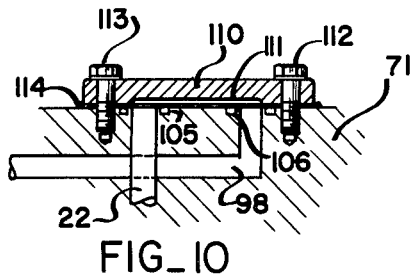
FIG_10
*INVENTOR.*
JOHN A. LAUCK
BY
*Oberlin, Maky & Donnelly*
ATTORNEYS

United States Patent Office 3,224,197
Patented Dec. 21, 1965

3,224,197
HYDROSTATIC TRANSMISSION
John A. Lauck, 1767 Commonwealth Ave.,
Benton Harbor, Mich.
Filed Oct. 3, 1963, Ser. No. 313,629
13 Claims. (Cl. 60—53)

This invention relates generally, as indicated, to a hydrostatic transmission and, more particularly, to certain improvements in hydrostatic transmissions of the type shown in my copending application, Serial No. 249,163, filed January 3, 1963, entitled "Hydrostatic Transmission," now Patent No. 3,171,256, granted March 2, 1965.

In such prior application, there is disclosed a hydrostatic transmission wherein the flow from the rotor-pintle type pump may be either varied infinitely automatically to a hydraulic motor in response to changes in torque demands or maintained at a maximum level until a predetermined pressure is reached.

Such results are achieved by providing a resilient spring member operative to control the displacement of the pump, which member can be pre-positioned to place a pre-load thereon when desired. Thus, if the spring member is positioned so that there is no pre-load thereon, the pump delivery will vary proportionately with the pressure. On the other hand, if the spring member is positioned so that is is pre-loaded, the flow will remain at substantially a maximum until the pre-load pressure is overcome, after which the flow will vary proportionately with the pressure. I have found that if the point at which force is exerted on the resilient spring member is varied so that as the spring member is moved from its full forward position toward its neutral position, the distance between such point and the center line of the spring control shaft is decreased, thus decreasing the effective length of the spring, maximum torque may be developed at the output shaft during the creeping or slow speed operation of a vehicle or the like as well as during high speed operation. Such full torque utilization at high engine r.p.m. and slow vehicle speeds is very desirable on large farm tractors, loaders, graders, and the like.

It is accordingly an important object of my invention to provide a hydrostatic transmission wherein there is full utilization of the output torque in the creep or slow speed position as well as in the full forward position.

It is another object to provide a resilient spring control lever having an operating pivot point which can be moved to vary its distance from the control shaft from a maximum at full forward position to a minimum at neutral position.

As was stated in my aforementioned prior application, the greatest leakage path in rotor-pintle type variable pumps is between the pintle and rotor. To overcome this leakage loss, a rotor and pintle construction was designed so that the pintle would sealingly engage the end of the rotor to trap the leakage therebetween, thus improving the overall efficiency of the pump. However, such sealing engagement results only when pressure is applied to one of the ports of the pintle, generally that in fluid communication with the flow line through which the fluid normally passes when the motor is driven in forward direction. This presents no problem where the efficiency of such transmissions in reverse isn't too important, as, for example, in tractors which are driven almost exclusively in the forward direction. However, a serious efficiency problem may develop in vehicles such as lift trucks, loaders, and the like which are sometimes driven in reverse as much as they are in forward direction.

It is, therefore, another important object of my invention to provide a rotor and pintle construction in which the pintle will sealingly engage the end of the rotor to trap the leakage between the rotor and pintle regardless of the direction of flow therethrough.

Some type of a power supply is required to raise and lower front and rear mounted attachments such as snow plows, buckets, hoes, cultivators, etc. on tractors. In the past this power supply has generally consisted of a small hydraulic pump, valve, and reservoir package which is belt-driven through a power take-off from the tractor engine. The hydraulic pump supplies hydraulic energy to a double acting cylinder which is connected to the attachments to raise and lower the same. This method of supplying the desired power to operate tractor mounted attachments has proven to be generally satisfactory in operation, but the equipment required for such power take-offs therefor is quite expensive.

An additional important object of my invention is then to provide a novel, inexpensive means for supplying hydraulic energy to operate attachments mounted on a tractor or other such vehicle driven by a hydraulic transmission.

It is yet another object to use the make-up and piston return pump of a hydrostatic transmission for operating such attachments and yet not interrupt the flow to the motor of such transmission.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of he various ways in which the principle of the invention may be employed.

In said annexed drawings:

FIG. 1 is a schematic diagram of a hydrostatic transmission in accordance with the present invention with the control lever in its full forward position;

FIG. 2 is a schematic diagram of such hydrostatic transmission with the control lever in its full reverse position;

FIG. 3 is an end elevation of the control lever of the hydrostatic transmission in full forward position;

FIG. 4 is an end elevation of the control lever which has been moved only a small increment toward such full forward position;

FIG. 5 is an end elevation of the control lever in the same position as that shown in FIG. 4, except that the pivot point on such control lever has been moved closer to the center line of the control shaft;

FIG. 6 is an end elevation of a control lever having an operating pivot point on the spring member thereof whose distance from the center line of the control shaft varies proportionately from a minimum at its neutral position to a maximum at its full forward position;

FIG. 7 is a side elevation of the control lever shown in FIG. 6;

FIG. 8 is an enlarged detailed view partially broken away and in section of the improved rotor and pintle construction for the pump;

FIG. 9 is a schematic diagram of the hydrostatic transmission having a four-way control valve in series with the make-up pump delivery system thereof; and FIG. 10 is a schematic diagram of that portion of the hydrostatic transmission to which the four-way control valve may be attached.

Referring now more particularly to FIGS. 1, 2, and 8, there is illustrated a variable delivery piston-type rotary pump 1 operatively connected to a gear-type hydraulic motor 2 through main fluid passages 3 and 4. The pump, which may generally be of a conventional type, consists of a rotor 5 which is driven by a drive shaft 6 from some source of power such as an internal combustion engine, not shown. The rotor rotates about a fixed valving pintle 7 having passageways 8 and 9 which are provided with outlets 10 and 11 connected to the main fluid passages 3 and 4. Pistons 12 are reciprocable in radially extending bores 13 provided in the rotor. Outer extensions or projections 14 of the pistons 12 engage and continuously contact the inside of the inner race 15 of a roller bearing 16 (shown in FIG. 8) which is retained by the inner wall 17 of the housing 18. Such housing is pivoted about a pivot pin 19 aligned with the center of the valving pintle and rotor. Thus the housing can be arranged either concentric with the rotor or oppositely eccentric therewith merely by pivoting the housing about its pivot pin.

The housing 18 in FIG. 1 is shown in what may be be termed the full forward position. In such position, with the rotor 5 rotating in the direction of the arrow, fluid in the system will be displaced into the main passage 3 from the passage 4. Such displacement is achieved in the following manner. As the pistons 12 move radially outwardly, they are supplied with fluid from the passage 4 which is pressurized at low pressure by means of a makeup pump 20 through an inlet check valve 21 which connects the outlet 22 of the pump with passage 23 connected to the main passage 4. The makeup pump 20 supplies fluid from a reservoir (not shown) both to the passage 23, through check valve 21, and to the passage 24 through check valve 25. The fluid thus pressurized enters the bores 13 of the pistons 12 as they pass from the 12 o'clock position to the 7 o'clock position maintaining them against the housing bearing race 15. This fluid is then forced out of the bores 13 into the main passage 3 as the pistons 12 move from the 5 o'clock position to the 12 o'clock position. The fluid then passes along the passageway 3 through the hydraulic motor 2 and returns to the pump 1 through the passage 4. Once the system has been charged, the make-up pump 20 supplies only enough hydraulic fluid to maintain piston return pressure or make-up for any voids in the hydraulic system.

When the housing 18 is in the concentric position with respect to the pintle 7 and rotor 5, communication between the passages 3 and 4 will be effectively blocked, and there will be no displacement of the pistons 12 due to the rotation of the rotor.

As disclosed in my aforementioned copending application, Serial No. 249,163, as the variable volume pump 1 reaches or approaches this position of minimum displacement, the hydraulic motor 2 tends to lock out. Furthermore, the motor 2 will not freewheel since there is a blocked discharge when the pump 1 is at zero displacement.

In order to preclude such lock out and permit freewheeling of the motor, there is provided a freewheeling valve 26 connected to the passages 3 and 4. Such freewheeling valve may for example be a poppet-type valve shown as having a spring loaded plunger 27 which holds the valve member 28 against the seat 29 normally closing fluid communication between passages 30 and 31. Thus when the valve member 28 is depressed against the pressure of the spring 32, the valve member will move away from the seat 29 permitting fluid to flow between the passages 30 and 31 and accordingly between the main passages 3 and 4.

As shown in FIGS. 1 and 2, the freewheeling valve 26 is operated by the same control mechanism as is the pump. The control mechanism comprises a pump control operator 33 pivoted on mounting shaft 34 for oscillation about the axis thereof by means of a control lever 35 which includes a control handle 36 having a control knob 37. The pump control operator has two projections 38 and 39 thereon, one projection 38 being operatively associated with the pump housing 18 and engaging in a slot or notch 40 to cause the housing 18 to pivot about its pivot pin 19 when the control handle 36 is moved back and forth. The other projection 39 is arranged to engage the rounded end 41 of the freewheeling valve 26 to depress the same as the control handle 36 approaches the neutral or vertical vertical position the freewheeling valve will be opened, position. Thus when the control handle is moved to the permitting flow from passage 4 to passage 3 or vice versa. In this manner, the motor 2 can operate as a freewheeling unit as the pump housing 18 approaches its concentric or neutral position.

It has been found that such motor lock out occurs when the pump output falls below approximately 15% of its maximum flow. Accordingly, a clearance is provided between the projection 39 and the top 41 of the valve member 28 so that the valve 26 is only actuated when the projection 39 is within 10° of the neutral or vertical position of the handle 36. Thus from this 10° point on either side of neutral position, the valve 26 will be opened, permitting the flow between lines 3 and 4 and allowing the motor 2 to operate as a freewheeling unit.

As the result of laboratory tests, it has been found that increased pressure to the hydraulic pump 1 causes the housing 18 to move toward the concentric position, thus tending to decrease the flow. Accordingly, the application of a spring load which will tend to keep the housing in its selected position of maximum eccentricity is all that is necessary in order for the pump to deliver automatically infinitely variable flow with changes in pressure. This has been accomplished by incorporating a spring loading means 42 in the control handle 36 itself, as illustrated in FIG. 3. As the pressure increases, the spring means 42 will flex from the dotted line position to the full line position. As the pump housing 18 moves toward its concentric position against bias of the spring means 42, the flow will be reduced proportionately causing the motor 2 to slow down as the demand for pressure increases. Conversely, when the torque output demand diminishes, the pressure demand also diminishes and the spring means 42 will again tend to bias the housing 18 to its position of maximum selected eccentricity, permitting the pump 2 to increase its displacement proportionately. The spring means 42 functions in the same manner in both the forward and reverse positions and a pressure or spring bias caused by the spring means increases as the pump housing 18 moves from its position of maximum selected eccentricity.

The spring means 42 is shown in the full forward position in FIG. 3. In such position it can be seen that considerable force is exerted on the operating pivot point 43 when there is full torque output. In FIG. 4, however, where the spring means 42 is shown as having been moved only a small increment in the direction of the full forward position, there is considerably less force exerted on the pivot point 43, since far less deflection of the spring means 42 is required to return it to the neutral position. As a result there is a much lower torque output from the transmission. Thus, in the case where the transmission is mounted on a tractor or like vehicle and the engine throttle is wide open, full utilization of the engine torque could not be realized in the creep or slow speed position. However, I have found that maximum torque output can be developed at slow speeds if the pivot point 43 is moved closer to the center line of the control shaft 34 as shown in FIG. 5, for example, so that the force required to deflect the spring means 42 will be equal at all times, regardless of whether the control lever 35 is in the full forward position or in some increment thereof.

One technique by which the fulcrum or pivot point 43 on the spring means 42 might be changed in order to develop maximum torque at the output shaft at all speeds in the forward direction is shown in FIGS. 6 and 7. As shown, a pivot pin 44 is provided with a longitudinal slot 45 in which is mounted the spring member 42 for movement therein. Two laterally spaced pinch bar plates 46 and 47 extend downwardly toward the shaft 34 and are provided with aligned slots 48 and 49, respectively, which guide pivot pin 44 extending therethrough. The pin 44 also extends through and is guided by a longitudinal slot 49' in the handle 36.

As can be seen in FIG. 6, the slots 48 and 49 extend from the neutral position of the control handle 36 to the full reverse position along an arc struck from the center of shaft 34 and from the neutral position to the full forward position along a path whose radial distance from the center line of the control shaft 34 increases from a minimum at the neutral position to a maximum at the full forward position. Thus the distance of the pivot point 43 of the spring member 42 from the center line of the control shaft 34 increases as the control lever 35 is advanced in the direction of its full forward position, but remains constant as the control lever is moved from the neutral position to the full reverse position.

The reason that the distance from the pivot point of the spring member to the center line of the control shaft is caused to remain constant when the control handle is moved from its neutral to its full reverse position, but is caused to increase when moved from such neutral to the full forward position is that, generally speaking, it is not necessary that there be maximum torque output at all speeds when operating in reverse. However, it will be appreciated that if such maximum torque were desirable when the motor 2 is operating in reverse as well as in forward, all that would be required would be to vary the distance of the pivot point 43 from the center line of the control shaft 34 from a minimum at the neutral position to a maximum at the full reverse position in the same manner that such distance is varied for the forward position.

In testing rotor-pintle type variable volume pumps, it has been noted that the greatest leakage path is between the pintle and the rotor. To overcome this leakage problem when the fluid from the pump is being forced in the forward direction of movement of the vehicle, the rotor and pintle construction disclosed in my copending application, Serial No. 249,163, was developed. However, it has been found that when the flow from such pump is reversed, the leakage may again occur because in such reverse direction of flow there is no differential of pressure to hold the pintle in sealing engagement with the rotor as there is when the fluid is flowing in the forward direction. To eliminate this leakage problem, the rotor and pintle construction as shown in FIG. 8 may be provided. Such leakage is avoided by maintaining sealing engagement between the pintle 7 and rotor 5 regardless of whether there is higher pressure in port 10 or port 11. The close fit of the fixed pintle 7 within the rotor 5 provides a valving means between the passages 8 and 9 of the pintle through ports 10 and 11 to the respective bores 13 of the rotor as the rotor rotates about the pintle. The pintle 7 is provided with a sealing flange 50, which makes engagement with the end 51 of the rotor 5, and O-rings 52 and 53 which seal the pintle 7 in the bore 54 of the block 55. The O-ring 52 is held between the annular flanges 56 and 57 and the O-ring 53 is held between the annular flanges 58 and 59. The pintle 7 may be held against rotation by a tab 60 engaged within slot 61 in the block 55.

By controlling the diameter of the pintle 7, it is possible to obtain a slight differential load which will urge the pintle axially into engagement with the rotor 5. For example, the pintle diameter $d$ within the rotor may be 1.125" and the outer or right hand portion of the pintle as seen in FIG. 8 may have an exposed diameter D equal to 1.250". The sealing flange 50 at its point of contact 62 with the rotor 5 may have a diameter $d'$ equal to 1.155". The high fluid pressure within the rotor 5 will fill the void 63 and act on the end face 64 of the rotor tending to move it axially outwardly. Such fluid pressure in the void 63 is caused by leakage along the exterior 65 of the pintle 7 and also acts within the annular portion 66 between the rotor and pintle on the area of the inner face 67 of the flange 50 between the exterior of the pintle and the point 62 where the flange 50 engages the rotor. The pressure within the rotor 5 acts on these areas tending to force the pintle 7 out of the rotor. However, since the outer diameter D of the pintle is slightly greater than the diameter $d'$ and the pressures acting on such areas are always the same, the pintle 7 will always remain in engagement with the rotor 5 when the high pressure is in port 10.

When pressure is applied through port 11, the pressure in the port acts on the differential areas of the diameter D' of the flange 50 minus the outer diameter D of the pintle 7, tending to push the pintle toward the left and into engagement with the end of the rotor 5. It is of course important that the areas of the diameter D' minus the area of the diameter D be greater than the area of the diameter $d'$. If the relationships of the areas as set forth above are maintained, there will always be a differential of pressure tending to maintain the pintle 7 seated against the rotor 5 when the high pressure is in port 11. Accordingly, with a given pressure P in port 10, PD (area) is greater than P$d'$ (area), and with such given pressure in port 11, PD' (area) —PD (area) is also greater than P$d'$ (area). Thus, regardless of which port is under pressure, there will be a force urging the pintle into sealing engagement with the rotor.

In the past, a small hydraulic pump, valve, and reservoir package was generally provided on a tractor or other such vehicle to supply operating motors for front and rear mounted attachments such as snow plows, rotary hoes, buckets, cultivators, etc. with the necessary hydraulic energy to raise and lower the same.

However, I have devised a means of taking fluid directly from the hydrostatic transmission to operate the attachments without interrupting the pump flow, thus eliminating the need for such auxiliary pumping equipment.

My novel attachment drive means is shown in FIG. 9 of the drawings, wherein there is illustrated a hydraulic cylinder 68 connected to the outlet 22 of the make-up pump 20 through a four-way control valve 69. The control valve includes a housing 70 secured to the housing 71 of the hydrostatic transmission as by means of fasteners 72 and 73. Within the valve housing 70 there is provided a valve chamber 74 having inlets 75 and 76, outlet 77, and passageways 78 and 79. A valve spool 80 is contained within the valve chamber 74 and is adapted to be reciprocated back and forth by means of valve handle 81 pivotally mounted at 82 on a projection 83 extending from the valve housing and at 84 on the end of the operating rod 85 of the valve member 80.

The valve 80 has a plurality of radially extending holes 86 in one end thereof and a longitudinal passageway 87 which connects the radial holes 86 to the other end of the valve spool. The valve 80 is also provided with longitudinally spaced lands 88, 89, and 90 which are adapted to sealingly engage the inner walls 91 of the valve chamber 74.

The passageways 78 and 79 are connected by flow lines 92 and 93 to chambers 94 and 95, respectively, of the double acting hydraulic cylinder 68. Within the cylinder 68 is a piston 96 having a piston rod 97 attached thereto and extending outwardly beyond the cylinder, such rod being adapted to be attached to either a front or a rear attachment on a tractor for raising and lowering the same.

The outlet 77 is connected to flow line 98 which, in turn, is connected to the main fluid passages 3 and 4 of the transmission by passageways 99 and 100 through check valves 101 and 102, respectively, serving the same purpose as check valves 21 and 25 in FIGS. 1 and 2.

O-rings 103 and 104 are inserted in annular grooves 105 and 106, respectively, provided in the outer surface 107 of the housing 71 of the hydrostatic transmission adjacent the bottom surface 108 of the valve housing 70 to provide a fluidtight seal around the inlet 76 and outlet 77 at the surfaces of contact between such housings.

In operation, when the valve handle 81 is in the neutral position, which is the position shown in FIG. 9, flow from the make-up pump 20 is precluded from entering either of the passageways 78 and 79 since they are effectively blocked by lands 89 and 90 of the spool valve 80. Consequently, while the valve handle 81 is in such neutral position, fluid flow to the chambers 94 or 95 of the hydraulic cylinder 68 is precluded.

However, the flow to the main pump 1 will not be interrupted since the fluid can enter through inlet 75 and pass through the holes 86 into the passageway 87 of the relief valve 80 and out through the outlet 77, which in turn is connected by means of passageways 99 and 100 to the fluid passages 3 and 4 of the main pump 1.

When it is desired to move the piston 96 to the right as seen in FIG. 9, it is only necessary to move the control handle 81 to the right, since such movement will cause the valve 80 to move to the left, thus closing inlet 75 and opening passageway 78 so that fluid can pass into the valve chamber 74 through inlet 76 and out through passageway 78 to the cylinder chamber 94. The fluid within chamber 95 will flow through flow line 93 into the valve chamber 74 through passageway 79 and out through the outlet 77.

When it is desired to move the piston 96 to the left as seen in FIG. 9, it is only necessary to move the control handle 81 to the left. When this occurs, the valve 80 is moved to the right, thus closing inlet 75 and allowing inlet 76 to be in fluid communication with passageway 79 which is connected to the cylinder chamber 95 by flow line 93. As the piston moves to the left, the fluid within chamber 94 will be forced through passageway 78 into the holes 86 of the valve 80 into the passageway 87 and out of the valve through outlet 77.

Should the valve handle 81 be held in either the left or the right position with the piston 96 of the hydraulic cylinder 68 at the end of the working stroke, the fluid pressure in the system will begin to rise. However, such pressure rise will be controlled by relief valve 109, which connects inlet 76 to outlet 77. All of the fluid which bypasses the four-way valve 69 through this relief valve will travel through passageways 99 and 100 to the inlet of the main pump 1.

Thus once the system has been primed with fluid, two separate pressure systems can be utilized without interruption of the flow to the main pump 1, regardless of whether or not the double acting cylinder 68 is being operated.

While the above system has been shown in conjunction with pistons which are returned hydraulically, it is obvious that the system has other applications. For example, it can be used where an inlet boost is required for any type of pump used in a hydraulic system.

When it is not desired to use the four-way valve 69 for supplying fluid pressure to a hydraulic cylinder, it can be removed and replaced with the plate 110 shown in FIG. 10 having a recess 111 in one surface thereof of such a length that it will connect the outlet 22 of the make-up pump 20 with flow line 98. The plate 110 is secured to the housing 71 of the transmission as by means of fasteners 112 and 113 and a gasket 114 is provided adjacent the peripheral edge of the plate and in contact with the transmission housing 71 to establish a fluid seal therebetween. When such gasket 114 is used, the O-rings 103 and 104 in the slots 105 and 106 are not necessary.

Other modes of applying the principle of the invention may be employed, change being made as regard the details described, provided the features stated in any of the following claims or the equivalent of such be employed.

I, therefore, particularly point out and distinctly claim as my invention:

1. A reversible rotor-pintle type fluid pump for hydrostatic transmissions and the like comprising a sealing flange on said pintle adapted sealingly to engage the end of said rotor, and fluid pressure means operative to urge said pintle and sealing flange into sealing engagement with said rotor while fluid is being pumped in either direction.

2. A fluid pump comprising a rotor, a fixed axis valving pintle disposed within said rotor, said pintle having two passageways therein, means associated with said rotor for pumping fluid between said passageways in either direction, and means on said pintle for maintaining the same in fluidtight engagement with said rotor during such pumping in either direction.

3. A reversible rotor-pintle type fluid pump comprising a nonrotatable valving pintle, a rotor mounted for rotation about said valving pintle, a flange on said pintle operative sealingly to engage the end of said rotor, the area of the diameter of said pintle within said rotor being less than the area of the diameter beyond said sealing flange, and the area of the diameter of said sealing flange minus the area of the diameter of said pintle beyond said flange being greater than the area of the diameter of said pintle within said rotor, whereby the same fluid pressure acting on said areas will always urge said pintle and sealing flange into sealing engagement with the end of said rotor while the fluid is being pumped in either direction.

4. A rotor-pintle type fluid pump comprising a rotor having a bore, a nonrotatable pintle disposed within said bore, said pintle having two fluid passageways therein, one of said passageways being closed at both ends and the other being closed at the end disposed within said rotor bore and open at the other end, openings in the walls of said passageways within said rotor bore, a sealing flange on said pintle adapted sealingly to engage the end of said rotor, an opening in the wall of said one passageway outside said rotor adjacent the outside face of said sealing flange, means for pumping fluid between said passageways through the openings in the walls of said pintle within said rotor and out the openings in the pintle outside said rotor, the area of the diameter of said pintle within said rotor being less than the area of the diameter of said rotor beyond said sealing flange, and the sum of the areas of such diameters being less than the area of the diameter of said sealing flange, whereby the fluid pressure created by pumping said fluid acting on said diameters will always maintain said flange and pintle in fluidtight engagement with the end of said rotor.

5. In a control mechanism for a hydrostatic transmission of the type having a variable capacity pump and a motor connected thereto, a control handle operatively connected to said pump and adapted to be pivoted to a position obtaining a selected flow output for said pump, spring means interconnecting said handle and pump for operatively resiliently maintaining said pump in its thus selected position, and means operative to vary automatically the effective length of said spring means so that maximum torque may be developed by said pump regardless of whether the fluid flow therethrough is high or low.

6. The control mechanism of claim 5 wherein the means to vary the effective length of said spring means includes at least one pinch bar plate disposed adjacent to and parallel with said spring means, said pinch bar plate having a slot therein, said slot extending from the neutral position to the full forward position along a path whose distance from the pivot axis of said control handle increases from a minimum at the neutral position to a maximum at the full forward position, and a horizontally disposed pivot pin mounted for movement in the slot in said pinch bar plate, said pivot pin having a longitudinal slot through which said spring means extends.

7. In combination with a hydrostatic transmission of the type having a variable capacity pump and a make-up pump connected thereto, a hydraulic piston cylinder assembly and a control valve, said assembly being operatively connected to said hydrostatic transmission between said make-up pump and said variable capacity pump by said control valve, each end of said assembly as well as said make-up pump and said variable capacity pump being in fluid communication with said control valve, said control valve having a valve member disposed therein for allowing fluid to flow from said make-up pump to one end of said assembly and from the other end of said assembly to said variable capacity pump when said member is disposed in one of two operative positions, and means in said valve member for allowing fluid to flow from said make-up pump directly to said variable capacity pump when said valve member is in its neutral position, means for moving said valve member into one of its selected operative positions, and means in said control valve for allowing fluid to flow directly from said make-up pump to said variable capacity pump when said assembly is held at either end of its working stroke while said valve member is in one of said operative positions, whereby there is no interruption of flow to said variable capacity pump from said make-up pump regardless of whether or not said hydraulic piston cylinder assembly is being operated.

8. A hydrostatic transmission comprising a rotor-pintle type pump, a control means operatively connected to said pump for obtaining a selected flow output therefrom, and a motor operatively connected to said pump to be driven thereby; said rotor-pintle type pump including a rotor, a fixed axis valving pintle disposed within said rotor, said pintle having two passageways therein, means associated with said rotor for pumping fluid between said passageways in either direction, and means on said pintle for maintaining the same in fluidtight engagement with said rotor during such pumping in either direction; said control means including means for obtaining maximum torque output from said pump at said selected flow output.

9. A hydrostatic transmission comprising a rotor-pintle type pump, a control means operatively connected to said pump for obtaining a selected flow output therefrom, and a motor operatively connected to said pump to be driven thereby; said rotor-pintle type pump including a rotor having a bore, a nonrotatable pintle disposed within said bore, a flange on said pintle operative sealingly to engage the end of said rotor, the area of the diameter of said pintle within said rotor being less than the area of the diameter beyond said sealing flange, and the area of the diameter of said sealing flange minus the area of the diameter of said pintle beyond said flange being greater than the area of the diameter of said pintle within said rotor, whereby the same fluid pressure acting on said diameters will always maintain said flange and pintle in fluidtight engagement with the end of said rotor; said control means including means for obtaining maximum torque output from said pump at said selected flow output.

10. A hydrostatic transmission comprising a rotor-pintle type pump, a control means operatively connected to said pump for obtaining a selected flow output from said pump, said control means including a control handle operatively connected to said pump and adapted to be shifted to a position obtaining said selected flow output, spring means interconnecting said handle and pump for operatively resiliently maintaining said pump in its thus selected position, and means operative to vary automatically the effective length of said spring means for obtaining maximum torque output from said pump at such selected flow output.

11. In combination, a hydrostatic transmission and a four-way control valve, said hydrostatic transmission comprising a rotor-pintle type pump operatively connected to a motor, a control means operatively connected to said pump to reverse the flow therethrough and control the capacity thereof, and a make-up pump operatively connected to said rotor-pintle type pump, said four-way control valve being operatively connected to said hydrostatic transmission between said make-up pump and said rotor-pintle type pump, said four-way control valve being adapted to be operatively connected to a hydraulic cylinder, said control valve including a valve member for allowing fluid to flow from said make-up pump to said hydraulic cylinder when said valve member is in its operative position and to said variable capacity pump when in its neutral position, means for moving said valve member into and out of said positions, and a relief valve operatively connecting said make-up pump directly to said rotor-pintle type pump, whereby the fluid from said make-up pump will bypass said control valve and flow directly to said rotor-pintle type pump through said relief valve when the pressure within said control valve reaches a predetermined value.

12. A hydrostatic transmission comprising a rotor-pintle type pump, a control means operatively connected to said pump, said rotor-pintle type pump including a rotor having a bore, a non-rotatable pintle disposed within said bore, said pintle having two fluid passageways therein, one of said passageways being closed at both ends and the other being closed at the end disposed within said rotor bore and open at the other end, openings in the wall of said passageways within said rotor bore, a sealing flange on said pintle adapted sealingly to engage the end of said rotor, an opening in the wall of said one passageway outside said rotor adjacent the outer face of said sealing flange, means for pumping fluid between said passageways through the openings in the walls of said pintle within said rotor and out the openings in the pintle outside said rotor, the area of the diameter of said pintle within said rotor being less than the area of the diameter of said rotor beyond said sealing flange, and the sum of such areas being less than the area of the diameter of said sealing flange, whereby the fluid pressure developed by pumping said fluid acting on said diameters will always maintain said flange and pintle in fluidtight engagement with the end of said rotor; said control mechanism including a control handle operatively connected to said pump and adapted to be shifted to a position obtaining a selected flow output for said pump, spring means interconnecting said handle and pump for operatively resiliently maintaining said pump in its thus selected position, and means associated with said spring means to vary the effective length of said spring means to obtain maximum torque output from said pump at said selected flow output.

13. In combination with the hydrostatic transmission of claim 12, a hydraulic cylinder and a four-way control valve, said hydraulic cylinder being operatively connected to said hydrostatic transmission between said make-up pump and said variable capacity pump by said control valve, said hydraulic cylinder comprising a piston disposed within said cylinder, said piston having a piston rod attached thereto and extending outwardly beyond said cylinder, said cylinder also having chambers on either side of said piston, each of said chambers as well as said make-up pump and said variable capacity pump being in fluid communication with said four-way control valve, said control valve having a valve means disposed therein for allowing fluid to flow from said make-up pump to one of the chambers of said hydraulic cylinder and from the other of said chambers to said variable capacity pump when disposed in one of two operative positions and for allowing fluid to flow from said make-up pump directly through said control valve to said variable capacity pump when in its neutral position, means for moving said valve means into one of its operative positions, and means in said control valve for allowing fluid to flow directly from said make-up pump to said variable capacity pump when said piston is held at either end of its working stroke while said valve means is in one of said operative positions, whereby there is no interruption of flow to said variable capacity pump regardless of whether or not said hydraulic cylinder is being operated.

(References on following page)

References Cited by the Examiner

UNITED STATES PATENTS

| | | | |
|---|---|---|---|
| 1,904,496 | 4/1933 | Maw | 60—53 |
| 2,166,423 | 7/1939 | Clark | 103—161 X |
| 2,211,402 | 8/1940 | Benedek | 60—53 |
| 2,293,692 | 8/1942 | Wylie | 103—161 |
| 2,600,632 | 6/1952 | French | 60—52 |
| 2,673,526 | 3/1954 | Horton | 103—161 |
| 2,961,829 | 11/1960 | Weisenbach | 60—53 |
| 3,008,423 | 11/1961 | Miller | 60—52 |
| 3,054,263 | 9/1962 | Budzich et al. | 60—53 |

EDGAR W. GEOGHEGAN, *Primary Examiner.*

SAMUEL LEVINE, *Examiner.*